J. C. MILLER.
Grain-Drill.
No. 6,050.
Patented Jan. 23. 1849.
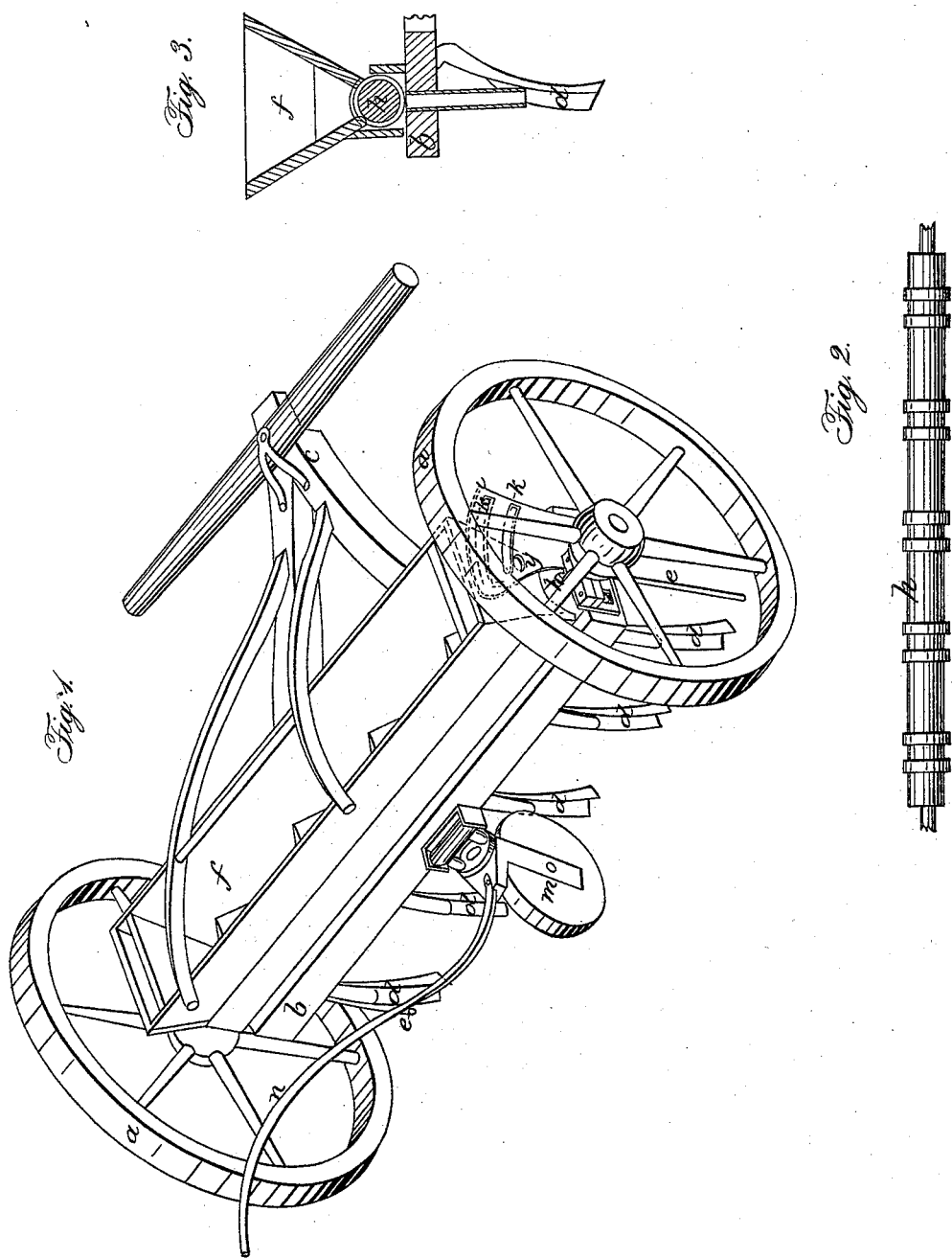

UNITED STATES PATENT OFFICE.

J. C. MILLER, OF MARIETTA, PENNSYLVANIA.

IMPROVEMENT IN SEED-PLANTERS.

Specification forming part of Letters Patent No. 6,050, dated January 23, 1849.

*To all whom it may concern:*

Be it known that I, JACOB C. MILLER, of Marietta, in the county of Lancaster and State of Pennsylvania, have invented certain new and useful Improvements in the Drill for Sowing Grain; and I do hereby declare that the following is a full, clear, and exact description of the principle or character which distinguishes them from all other things before known, and of the usual manner of making, modifying, and using the same, reference being had to the accompanying drawings, in which—

Figure 1 is an isometrical view, and Fig. 2 is a view of the roller detached.

The nature of my invention consists in the construction and arrangement of the revolving seed distributer and hopper for regulating the quantity of grain sown, and in the employment of a guide-wheel, $m$, attached to the rear of the axle in the center, by which the machine can be guided and turned.

The construction is as follows:

A pair of common cart or other wheels, $a$, support a bar or frame, $b$, having bearings on which their axles turn. To this bar $b$ a pole, $c$, is connected, by which the machine is drawn by horses or other animals. A row of teeth, $d$, are also affixed to the bar and project down a little below the wheels above named. These are for opening the ground preparatory to dropping the wheat or other grain which is to be sown. At each end of the row of teeth there is a bar, $e$, extending down so as to bear on the surface of the ground when the teeth have entered a proper depth, and thus to regulate the depth the teeth shall enter the ground.

Above the axle there is a hopper, $f$, in the bottom of which a roller, $h$, works, which is attached to the wheels $a$. This roller has grooves turned in it, as clearly shown in the detached figure, 2. The hopper $f$ is divided on the inside into compartments, the sides of which converge toward the bottom in an inverted pyramid form. Each of these compartments has an opening downward at its apex, through which the grain passes down into the grooves in the roller $h$, whence it falls into the furrows. Behind the teeth $d$ (see Fig. 3) the hopper is suspended upon two standards, $i$, one at each end, in such a way as to be moved back and forward in a curved direction, for the purpose of regulating the quantity of grain to be distributed in passing over a given distance. This is effected by two screws, $y$, that pass through curved slits $k$ in the standards into the hopper and fasten it in any position it is set to. By moving the hopper over the roller forward it is nearer the point at which the grain is dropped, and the angle of inclination is increased, by which a greater quantity of grain is distributed at each revolution of the roller; and when it is moved back the distance the roller has to carry the grain is greater and the angle of the hopper is diminished, and the quantity of grain distributed at each revolution is diminished.

Behind the axle, at the center thereof, a wheel, $m$, is fastened by a universal joint. The frame in which said wheel runs and by which it is turned has a handle, $n$, projecting back from it and curved upward. When this machine is in operation this wheel is turned up or runs lightly over the ground; but when required to operate to raise the teeth out of the ground or to turn the drill the handle is brought down, carrying the wheel under its bearing, which raises the teeth, and then by canting the wheel to one side the machine is easily turned in any direction.

Having thus fully described my improved seed-drill, what I claim therein as new, and for which I desire to secure Letters Patent, is—

1. The construction and arrangement of the adjustable hopper and grooved roller, combined as above set forth, and for the purposes designated.

2. The center hind wheel, $m$, for guiding and regulating the apparatus, as hereinbefore described.

JACOB C. MILLER.

Witnesses:
  J. T. ANDERSON,
  HENRY S. MUSSER.